US011866918B2

(12) United States Patent
Kim

(10) Patent No.: US 11,866,918 B2
(45) Date of Patent: Jan. 9, 2024

(54) FOOD WASTE DISPOSAL DEVICE

(71) Applicant: WARM DREAM CO.,LTD, Suwon-si (KR)

(72) Inventor: Yong-Goo Kim, Pyeongtaek-si (KR)

(73) Assignee: WARM DREAM CO., LTD

( * ) Notice: Subject to any disclaimer, the term of this patent is extended or adjusted under 35 U.S.C. 154(b) by 631 days.

(21) Appl. No.: 17/096,070

(22) Filed: Nov. 12, 2020

(65) Prior Publication Data

US 2021/0164209 A1 Jun. 3, 2021

Related U.S. Application Data

(63) Continuation of application No. PCT/KR2019/016676, filed on Nov. 29, 2019.

(30) Foreign Application Priority Data

Nov. 29, 2019 (KR) ........................ 10-2019-0156440

(51) Int. Cl.
*E03C 1/266* (2006.01)
*B02C 18/00* (2006.01)
(Continued)

(52) U.S. Cl.
CPC ........ *E03C 1/2665* (2013.01); *B02C 18/0092* (2013.01); *B02C 18/142* (2013.01); *B02C 18/2216* (2013.01); *B02C 18/2225* (2013.01)

(58) Field of Classification Search
CPC . B02C 18/30; B02C 18/2216; B02C 18/2225; B02C 19/22; B02C 18/0084;
(Continued)

(56) References Cited

U.S. PATENT DOCUMENTS 4,685,626 A 8/1987 Kerdiles et al.
5,451,004 A * 9/1995 Altonji ................ B02C 18/0092 209/234
2017/0080661 A1* 3/2017 Lin .......................... A23N 1/02

FOREIGN PATENT DOCUMENTS

KR 10-2000-0032455 A 6/2000
KR 200360329 Y1 * 8/2004 ............ B02C 19/22
(Continued)

OTHER PUBLICATIONS

Translation of KR-200360329 (Year: 2004).*
(Continued)

*Primary Examiner* — Bobby Yeonjin Kim
(74) *Attorney, Agent, or Firm* — Park & Associates IP Law Office

(57) ABSTRACT

The present invention relates to a food waste disposer that is configured to allow an opening and closing plate adapted to open and close a drain pipe to be open only when a motor operates, so that normally, the drain pipe from which water is discharged is closed, thereby preventing bad smell and sewage from flowing backward from the drain pipe, to allow a propeller adapted to forcedly discharge the water from a casing to the drain pipe to be driven reversely and to thus close the opening and closing plate if the motor is driven reversely, so that gears inside a pulverizing part rotate to circulate the water in the casing and thus to automatically clean the casing, without any separation of the casing, and to allow a magnetic material to be built in a hopper so that if iron introduced into the hopper is sensed by sensors, the pulverizing part stops working and is thus prevented from being damaged by the iron.

4 Claims, 11 Drawing Sheets

(51) Int. Cl.
*B02C 18/14* (2006.01)
*B02C 18/22* (2006.01)

(58) Field of Classification Search
CPC . B02C 18/0092; B02C 18/186; B02C 18/142; B02C 2201/063; E03C 1/266; E03C 1/2665
See application file for complete search history.

(56) References Cited

FOREIGN PATENT DOCUMENTS

| | | | |
|---|---|---|---|
| KR | 20-0383227 | Y1 | 5/2005 |
| KR | 10-1440235 | B1 | 9/2014 |
| KR | 10-2017-0114330 | A | 10/2017 |
| KR | 10-1847093 | B1 | 5/2018 |

OTHER PUBLICATIONS

Korean Office Action (KR 10-2019-0156440), KIPO, dated Dec. 16, 2019.
Korean Notice of Allowance (KR 10-2019-0156440), KIPO, dated Jan. 1, 2020.

* cited by examiner

FOOD WASTE DISPOSAL DEVICE

REFERENCE TO RELATED APPLICATIONS

This is a continuation of International Patent Application PCT/KR2019/016676 filed on Nov. 29, 2019, which designates the United States and claims priority of Korean Patent Application No. KR 10-2019-0156440 filed on Nov. 29, 2019, the entire contents of which are incorporated herein by reference.

FIELD OF THE INVENTION

The present invention relates to a food waste disposer, and more particularly, to a food waste disposer that is located on a sink drain to pulverize food waste generated by washing dishes and food and to thus separate solids and water from the pulverized food waste, thereby reducing the volume of the food waste, and that prevents bad smell and sewage from flowing backward from a drain pipe, thereby solving sanitation problems.

BACKGROUND OF THE INVENTION

A filter is located in a drain pipe of a sink in a kitchen of a general house or restaurant to prevent the drain pipe from being clogged with food waste generated by washing dishes and food.

In this case, food waste is accumulated in the filter to cause water drainage to become bad, and also, bad smell is generated from the accumulated food waste.

If the food waste is left for long hours, without any treatment, bad smell is generated therefrom, and further, worms and bacteria are cultivated to have a bad influence on the surrounding environments.

In the kitchens of general houses or restaurants, accordingly, the filter in which the food waste is accumulated is drawn from the drain pipe of the sink, and next, the food waste is put into a food waste bin and is thus thrown away. As the food waste contains a large amount of water, in this case, it is bulky and heavy, thereby accompanying a high cost of food waste disposal and insanitation problems.

So as to solve such problems, a conventional food waste treatment device is disclosed in Korean Patent No. 10-1847093 (entitled "food waste treatment device for sink"), which is hereinafter referred to as "conventional technology".

FIG. 1 is an exploded perspective view showing a food waste treatment device for a sink according to a conventional technology.

The food waste treatment device 100 for a sink according to the conventional technology includes a hopper 110 located on a sink drain to collect pulverization objects thereto and to thus move them downward, fine pulverizing means 120 for pulverizing the pulverization objects introduced from the hopper 110 thereinto, and a forced discharging means 130 located on the underside of the fine pulverizing means 120 to discharge the pulverization objects pulverized to the outside.

The hopper 110 has a conical shape and is coupled to the sink drain to collect the pulverization objects thereto.

The fine pulverizing means 120 is located under the hopper 110 and includes a housing 121, a pair of screws 122, a net body 123, and a housing cover 124.

The housing 121 has the shape of a cylinder whose front surface is open and rear surface is closed, and further, the housing 121 has an opening 1211 formed on top thereof in such a manner as to be connected to the lower end periphery of the hopper 110.

Furthermore, the housing 121 has a water outlet (not shown) formed on bottom thereof.

The water outlet is located on the rear side of the bottom of the housing 121 in such a manner as to discharge water of the pulverization objects pulverized by means of the screws 122 therethrough.

The screws 122 engage with each other horizontally inside the housing 121 and thus rotate, and if helical-shaped teeth formed on the outer peripheral surfaces of the screws 122 engage with each other to thus rotate the screws 122, the pulverization objects introduced from the hopper 110 can be pulverized.

The net body 123 is located on the outside of the screws 122 and has a perforated surface formed on the underside thereof in such a manner as to allow the water of the pulverization objects pulverized by means of the screws 122 to be discharged through the water outlet.

The housing cover 124 has the shape of a cylinder whose front surface is closed and rear surface is open in such a manner as to be detachably mounted on the front side of the housing 121.

Further, the housing cover 123 has a solid outlet 1241 formed on the underside thereof to discharge the solids of the pulverization objects pulverized by means of the screws 122 therethrough.

The forced discharging means 130 is located just on the underside of the housing 121 in such a manner as to communicate with the water outlet of the housing 121.

The forced discharging means 130 has an impeller 131 located at the inside thereof to apply a forward propelling force in a forward direction by means of a rotating force received from a motor 132.

The forced discharging means 130 forcedly discharges the water of the pulverization objects introduced from the water outlet to a drain pipe by means of the impeller 131.

Under the above-mentioned configuration of the conventional technology, the pulverization objects introduced from the hopper 110 are separated into the water and the solids through the fine pulverizing means 120, thereby reducing mass and volume of the food waste.

However, the food waste treatment device 100 according to the conventional technology does not have any separate backflow prevention function, so that sewage and bad smell flow backward from the drain pipe, thereby causing many inconveniences while the food waste treatment device 100 is being used.

Further, the food waste treatment device 100 according to the conventional technology does not have any separate cleaning means, and so as to prevent bad smell from coming up therefrom, accordingly, the housing cover 124 is periodically separated to directly clean the internal parts thereof, thereby making it inconvenient to use.

Furthermore, the food waste treatment device 100 according to the conventional technology causes the teeth of the screws 122 to be damaged if iron like spoons or chop sticks is introduced thereinto to collide against the screws 122.

SUMMARY OF THE INVENTION

Accordingly, the present invention has been made to solve the above-mentioned problems, and it is an object of the present invention to provide a food waste disposer that is capable of allowing an opening and closing plate adapted to open and close a drain pipe to be open only when water is discharged to the drain pipe, so that in a state where the water discharge is finished, the drain pipe is closed by means of the opening and closing plate, thereby preventing bad smell and sewage from flowing backward from the drain pipe.

It is another object of the present invention to provide a food waste disposer that is capable of allowing an opening and closing plate to be closed, without opening a casing cover, if a motor is driven reversely, thereby cleaning internal parts thereof.

It is yet another object of the present invention to provide a food waste disposer that is capable of allowing a magnetic material to be built in a hopper into which pulverization objects and water are introduced, so that if iron introduced into the hopper is sensed by sensors, a pulverizing part stops working.

To accomplish the above-mentioned objects, according to the present invention, there is provided a food waste disposer adapted to pulverize pulverization objects introduced thereinto and thus to separatedly discharge the pulverization objects into solids and water, the food waste disposer including: a box-shaped casing having a solid outlet formed on one side thereof to discharge the solids therefrom and a water outlet formed on a lower portion thereof to discharge the water therefrom; a hopper located on top of the casing in such a manner as to introduce the pulverization objects into the casing; a pulverizing part located inside the casing to pulverize the pulverization objects introduced from the hopper; a water discharging part for discharging the water of the pulverization objects pulverized by means of the pulverizing part to the outside of the casing; and a driving part for transferring power to the pulverizing part and the water discharging part, wherein the pulverizing part includes: a plurality of pulverizing means located inside the casing to pulverize the pulverization objects and thus to move the solids of the pulverization objects pulverized in a forward direction; and a filter located on the outside of the pulverizing means and having water discharging holes adapted to discharge the water of the pulverization objects pulverized by means of the pulverizing means therethrough and at least one or more solid discharging holes adapted to discharge the solids of the pulverization objects pulverized by means of the pulverizing means therethrough, each pulverizing means including: a pulverizing shaft whose front end periphery is connected to the casing; a pulverizing gear located under the hopper in such a manner as to be fitted to the pulverizing shaft; and a compressing gear located in front of the pulverizing gear in such a manner as to be fitted to the pulverizing shaft to compress the pulverization objects pulverized by the pulverizing gear thereagainst, and the pulverizing means being spaced apart from each other in a transverse direction of the casing in such a manner as to allow the pulverizing gears to engage with each other.

According to the present invention, desirably, the filter includes: a filter cover comprising a pair of compressing gear insertion portions having the shapes of hollow cylinders whose front surface are closed to insert the front end peripheries of the compressing gears thereinto and an extended flange extended outward from the rear end peripheries of the compressing gear insertion portions to connect the compressing gear insertion portions to each other; a pair of front filters each having the shape of a pair of hollow semicircular cylinders connected to each other in a transverse direction and each provided with an insertion projection extended outward from the rear end periphery thereof so that as the front end peripheries thereof are inserted into the compressing gear insertion portions, the front filters are located above and under the compressing gears to thus surround the compressing gears; and a pair of rear filters each having the shape of a pair of hollow semicircular cylinders connected to each other in a transverse direction so that as the front end peripheries thereof are inserted into the insertion projections of the front filters, the rear filters are located above and under the pulverizing gears to thus surround the pulverizing gears, the front filters and the rear filters having a plurality of water discharging holes formed on the outer peripheral surfaces thereof, the upper side rear filter of the rear filters having a pulverization object introducing hole adapted to introduce the pulverization objects introduced from the hopper thereinto, and the filter cover having the solid discharging holes formed on the front surface thereof to discharge the solids of the pulverization objects therethrough.

According to the present invention, desirably, the casing includes: a pulverizing part casing adapted to locate the pulverizing part at the inside thereof in such a manner as to allow top thereof to communicate with the hopper; a casing cover located on the front side of the pulverizing part casing in such a manner as to allow the rear surface thereof to communicate with the pulverizing part casing to thus discharge the solids of the pulverization objects discharged through the solid discharging holes through the solid outlet; a water discharging part casing adapted to locate the water discharging part at the inside thereof in such a manner as to be connected to the underside of the pulverizing part casing; and a driving part casing adapted to locate the driving part at the inside thereof in such a manner as to be connected to the rear sides of the pulverizing part casing and the water discharging part casing.

According to the present invention, desirably, the casing cover has a flange insertion groove formed on the inner peripheral surface in such a manner as to insert the extended flange of the filter cover thereinto, and as the extended flange is inserted into the flange insertion groove, the filter cover isolates the casing cover from the pulverizing part casing to prevent the solids and water of the pulverization objects discharged from the filter from being mixed together.

According to the present invention, desirably, the water discharging part, which is located inside the water discharging part casing, includes: a propeller driving shaft rotating with a driving force received from the driving part; a propeller fitted to a front periphery of the propeller driving shaft; and an opening and closing plate located on an end portion of the water discharging part casing in such a manner as to open and close the end portion of the water discharging part casing, the opening and closing plate being open when the propeller rotates forward.

According to the present invention, the food waste disposer is configured to allow the opening and closing plate adapted to open and close the drain pipe to be open only when the motor operates, so that normally, the drain pipe from which water is discharged is closed, thereby preventing bad smell and sewage from flowing backward therefrom.

In addition, the food waste disposer according to the present invention is configured to allow the propeller adapted to forcedly discharge the water from the casing to the drain pipe to be driven reversely and to thus close the opening and closing plate if the motor is driven reversely, so that the gears inside the pulverizing part rotate to circulate the water in the casing and thus to automatically clean the casing, without any separation of the casing.

Further, the food waste disposer according to the present invention is configured to allow the magnetic material to be built in the hopper so that if iron introduced into the hopper is sensed by the sensors, the pulverizing part stops working and is thus prevented from being damaged by the iron.

DETAILED DESCRIPTION OF THE INVENTION

Hereinafter, the present invention will now be described in detail with reference to the attached drawings.

Figure 1:
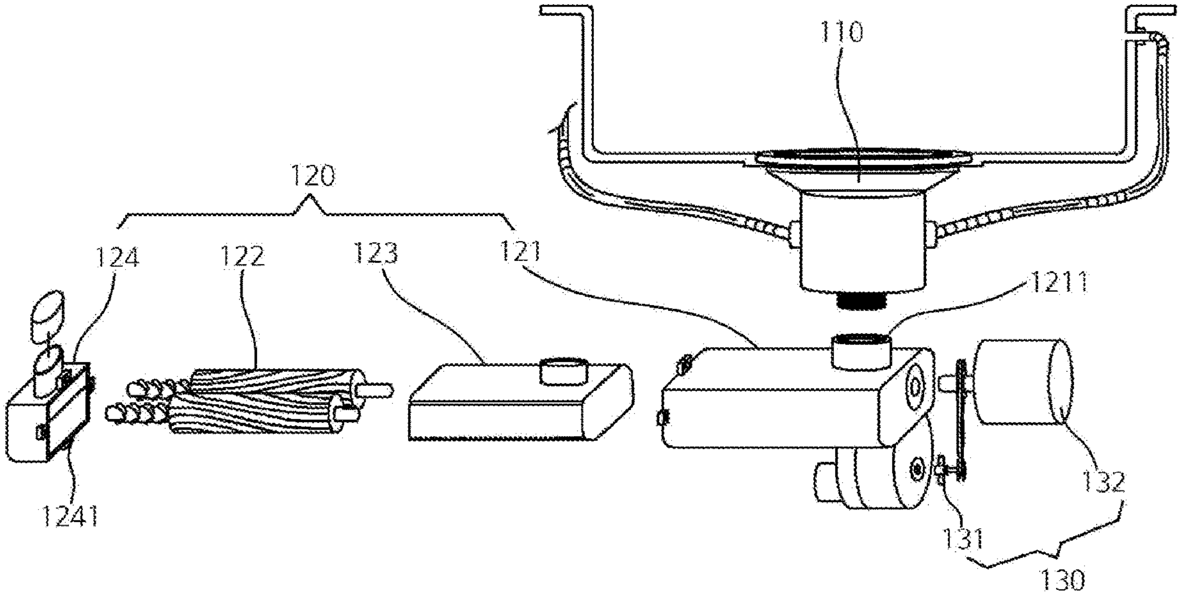
FIG. 1 is an exploded perspective view showing a food waste treatment device for a sink according to a conventional technology.
Figure 2:
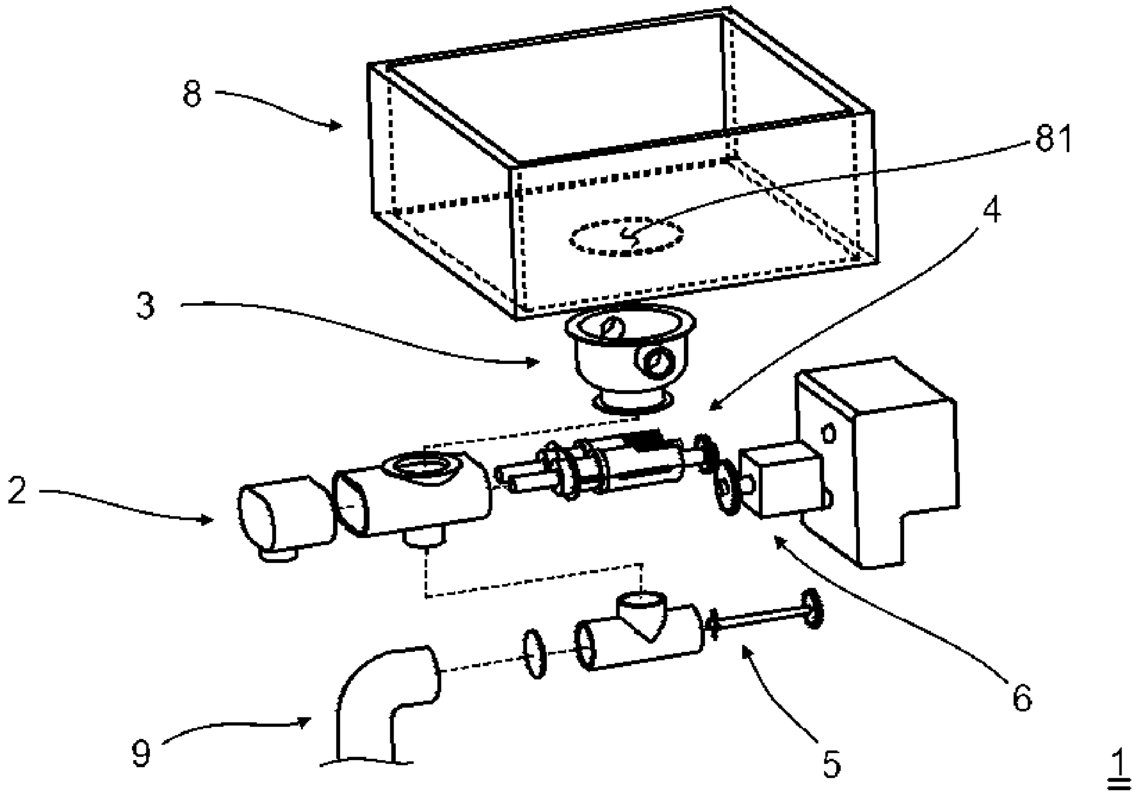
FIG. 2 is an exploded perspective view showing a food waste disposer according to the present invention.

FIG. 2 is an exploded perspective view showing a food waste disposer according to the present invention.

As shown in FIG. 2, a food waste disposer 1 according to the present invention includes a casing 2, a hopper 3 located on top of the casing 2 in such a manner as to be inserted into a drain 81 of a sink 8 to allow food waste (hereinafter, referred to as 'pulverization objects') to be transferred to the inside of the casing 2, a pulverizing part 4 for pulverizing the pulverization objects introduced from the hopper 3 thereinto, a water discharging part 5 for discharging water in the casing 2 to a drain pipe 9 through a propeller 52, and a driving part 6 for transferring power to the pulverizing part 4 and the water discharging part 5.

Figure 3:
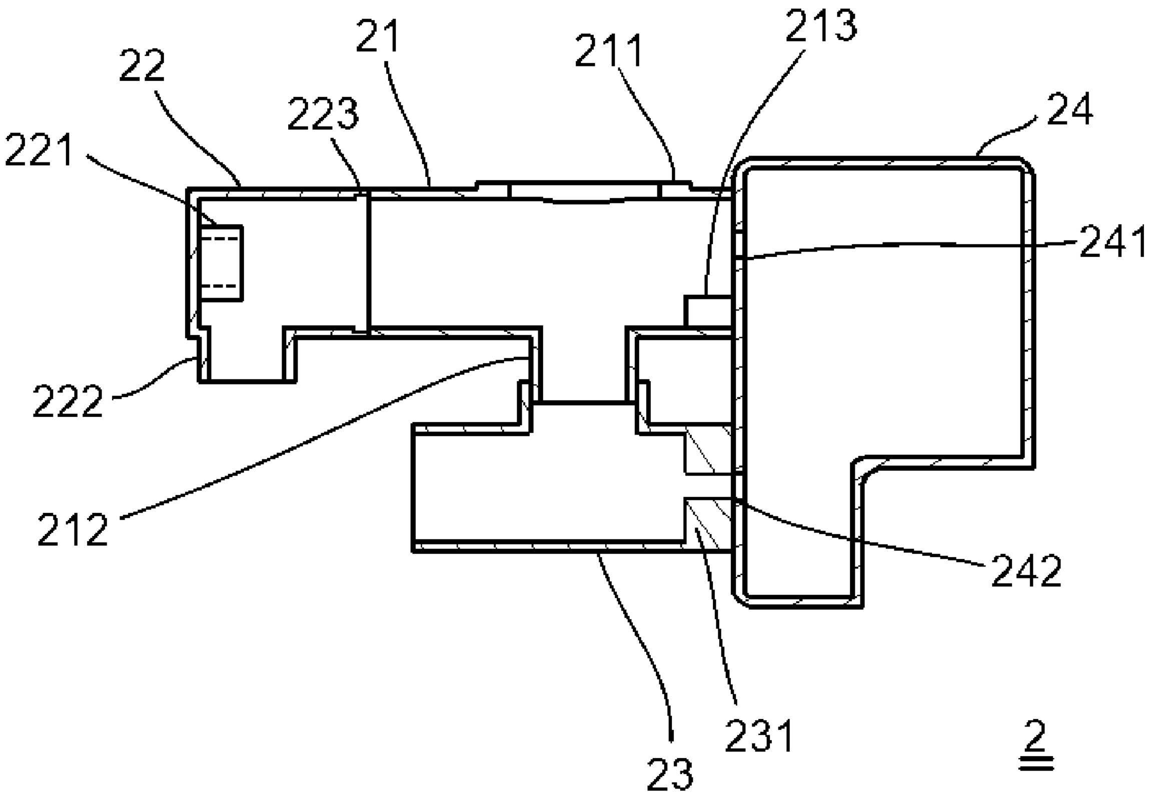
FIG. 3 is a sectional view showing a casing of FIG. 2.

FIG. 3 is a sectional view showing the casing of FIG. 2.

The casing 2 includes a pulverizing part casing 21 for locating the pulverizing part 4 at the inside thereof, a casing cover 22 located on the front side of the pulverizing part casing 21, a water discharging part casing 23 provided on the underside of the pulverizing part casing 21 in such a manner as to locate the water discharging part 5 at the inside thereof, and a driving part casing 24 provided on the back side of the pulverizing part casing 21 in such a manner as to locate the driving part 5 at the inside thereof.

The pulverizing part casing 21 has the shape of a box open on the front and back surfaces thereof and is provided with an introducing portion 211 formed on top thereof in such a manner as to be coupled to the hopper 3 to introduce the pulverization objects thereinto.

Further, the pulverizing part casing 21 is provided with a water transferring portion 212 formed on underside thereof in such a manner as to transfer the water introduced from the hopper 2 to the water discharging part casing 23.

Furthermore, the pulverizing part casing 21 is provided with protrusions 213 protruding from bottom thereof behind the water transferring portion 212.

The protrusions 213 have the shapes corresponding to discharging holes 4351 formed on a second rear filter 435 of a filter 43 as will be discussed later, and when the discharging holes 4351 are coupled to the rear sides of the protrusions 213, the protrusions 213 serve to close the discharging holes 4351 to prevent solids from being discharged through the discharging holes 4351.

The casing cover 22 has the shape of a box closed on the front side thereof and open on the rear side thereof.

Further, the rear end portion of the casing cover 22 is coupled to the front end portion of the pulverizing part casing 21.

In this case, the casing cover 22 includes hollow cylindrical shaft insertion portions 221 protruding backward from the front surface thereof in such a manner as to insert front end peripheries of pulverizing shafts 411 and 421 as will be discussed later thereinto and a hollow cylindrical solid outlet 222 formed on the underside thereof in such a manner as to discharge solids of the pulverization objects introduced into the pulverizing part 4 therethrough.

Further, the casing cover 22 includes a flange insertion groove 223 formed on the rear end thereof in such a manner as to insert an extended flange 4312 of a filter cover 431 as will be discussed later thereinto.

The water discharging part casing 23 has the shape of a box open on the front and rear surfaces thereof and is configured to allow top thereof to communicate with the water transferring portion 212 of the pulverizing part casing 21 to thus receive the water introduced into the pulverizing part casing 21.

Further, the water discharging part casing 23 is provided with a water outlet formed on the front end thereof in such a manner as to be connected to the drain pipe 9 of FIG. 2, and accordingly, the water introduced into the water discharging part casing 23 is discharged to the drain pipe 9 through the water discharging part 5.

Furthermore, the water discharging part casing 23 has a driving shaft fitting portion 231 formed on the rear end thereof in such a manner as to allow a propeller driving shaft 51 as will be discussed later to pass therethrough.

The driving part casing 24 has the shape of a box and is provided with a first through hole 241 and a second through hole 242 formed on the front surface thereof in such a manner as to pass the second pulverization shaft 421 and the propeller driving shaft 51 as will be discussed later therethrough.

Moreover, the driving part casing 24 locates the driving part 6 at the inside thereof.

Figure 4:
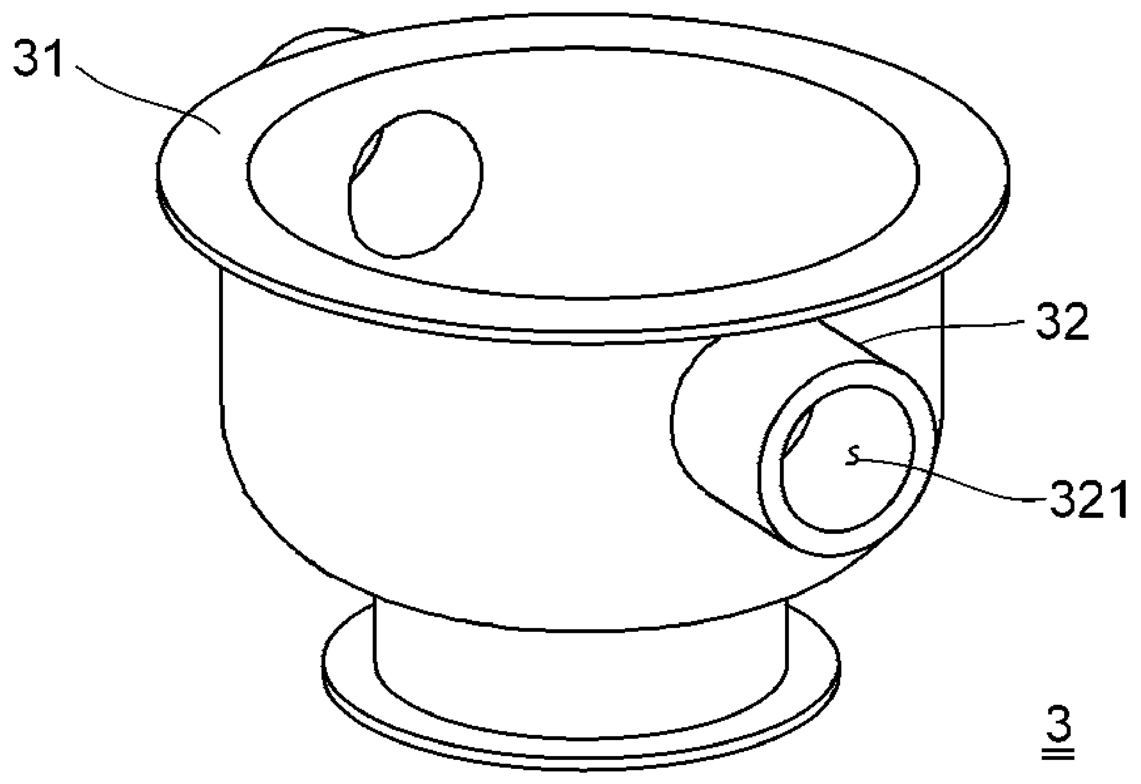
FIG. 4 is a perspective view showing a hopper of FIG. 2.

FIG. 4 is a perspective view showing the hopper of FIG. 2.

As shown in FIG. 4, the hopper 3 has a conical shape and serves to collect the pulverization objects generated by cooking food or washing dishes.

Further, the hopper 3 has a flange 31 extended outward from the top end periphery thereof in such a manner as to be mounted on the drain 81 of the sink 8.

Further, the lower end periphery of the hopper 3 is coupled to the introducing portion 211 of the pulverizing part casing 21, and accordingly, the pulverization objects collected inside the hopper 3 are discharged to the pulverizing part casing 21 through the introducing portion 211.

In this case, the hopper 3 has a plurality of connectors 32 formed on the side peripheral surface thereof.

The connectors 32 have cylindrical shapes and are provided with connector insertion holes 321 communicating with the inside of the hopper 3 in such a manner as to insert drain pipes of a dish washer and a water purifier thereinto.

For the convenience of the description, in this case, the connectors 32 are formed on the side periphery of the hopper 3, but of course, they may be formed on the casing 2, without being limited thereto.

Further, the hopper 3 is made of a plastic material and has a magnetic material built therein to prevent iron like spoons and chop sticks from being introduced into the casing 2, thereby avoiding the pulverizing part 4 from being damaged.

Moreover, the hopper 3 is provided with sensors (not shown), and if the pulverization objects are introduced into the hopper 3, the driving part 6 operates under the control of a controller (not shown) to allow the pulverization objects to be pulverized. Contrarily, if the iron is introduced into the hopper 3, the driving part 6 stops working to prevent the pulverizing part 4 from being damaged by the iron.

In this case, various known sensors as the sensors are available, and a detailed explanation on the sensors will be avoided for the brevity of the description.

Figure 5:
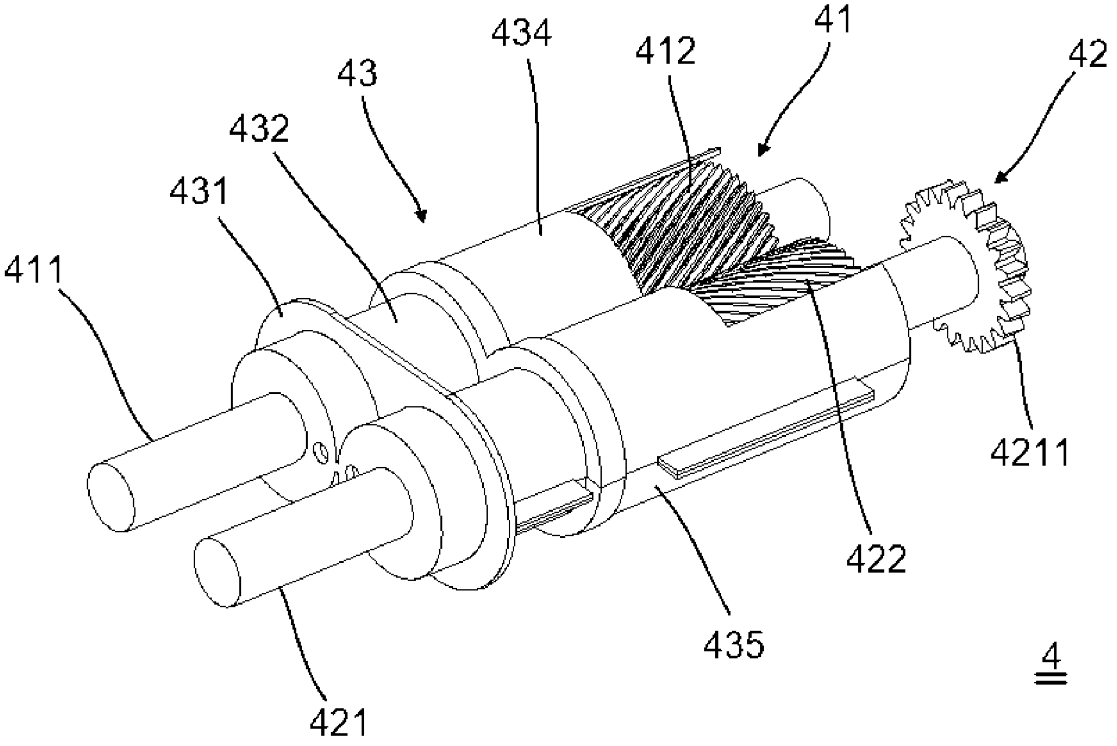
FIG. 5 is a perspective view showing a pulverizing part of FIG. 2.
Figure 6:
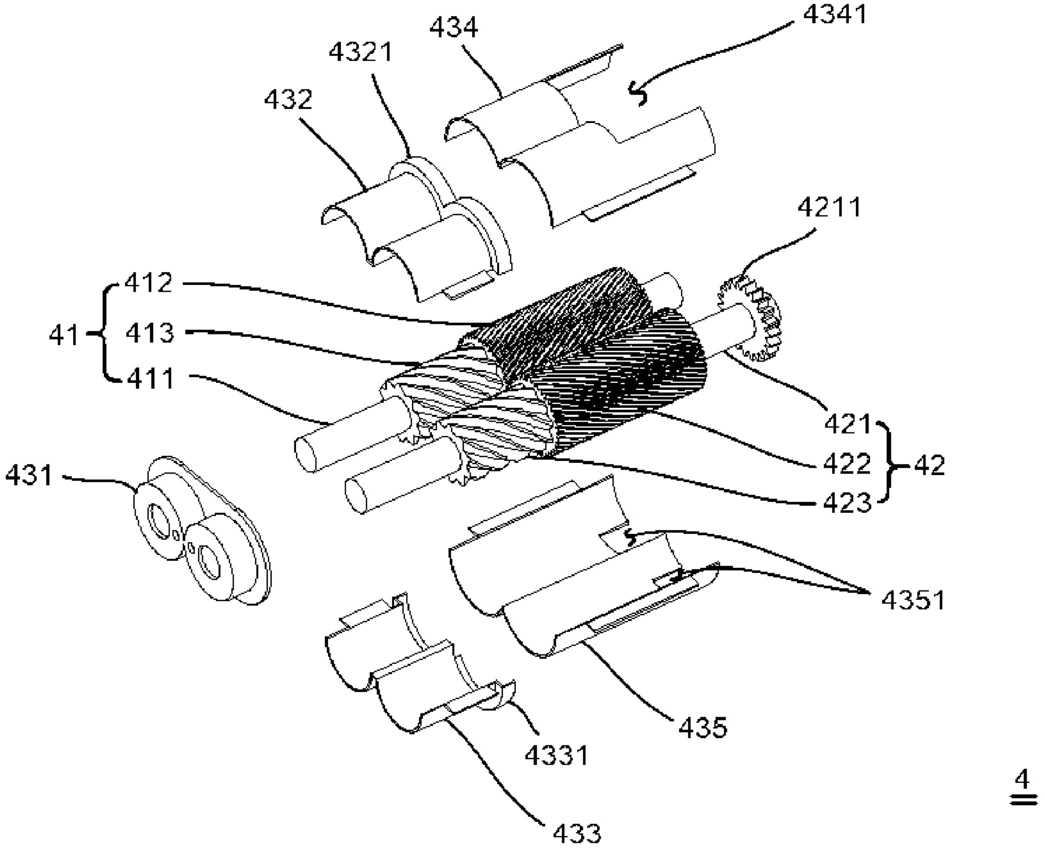
FIG. 6 is an exploded perspective view showing the pulverizing part of FIG. 5.

FIG. 5 is a perspective view showing the pulverizing part of FIG. 2, and FIG. 6 is an exploded perspective view showing the pulverizing part of FIG. 5.

The pulverizing part 4 includes first and second pulverizing means 41 and 42 and the filter 43.

The first pulverizing means 41 is comprised of the first pulverizing shaft 411, a first pulverizing gear 412, and a first compressing gear 413.

The first pulverizing shaft 411 whose front end periphery is inserted into one of the shaft insertion portions 221 formed on the casing cover 22.

The first pulverizing gear 412 is fitted to the first pulverizing shaft 411 in such a manner as to be located under the introducing portion 211 of the pulverizing part casing 21.

The first compressing gear 413 is fitted to the first pulverizing shaft 411 in such a manner as to be located in front of the first pulverizing gear 412 to compress the pulverization objects pulverized by the first pulverizing gear 412 thereagainst, to discharge water through the compression, and to discharge solids of the pulverization objects to the solid discharging holes 43112 formed on the filter cover 431 of the filter 43 as will be discussed later.

The second pulverizing means 42 is spaced apart from the first pulverizing means 41 in a transverse direction and has a second pulverizing gear 422 and a second compressing gear 423 having the same shapes and structures as the first pulverizing gear 412 and the first compressing gear 413 of the first pulverizing means 41. However, the second pulverizing means 42 has a second pulverizing shaft 421 having different shape and structure from the shape and structure of the first pulverizing shaft 411.

The second pulverizing shaft 421 is longer than the first pulverizing shaft 411 of the first pulverizing means 41 and has a first driven gear 4211 fitted to a position close to the rear end periphery thereof.

The first driven gear 4211 engages with a driving gear 63 of the driving part 6 as will be discussed later and rotates with a driving force received from the driving part 6, so that the second pulverizing shaft 421 to which the first driven gear 4211 is fitted rotates.

First, the first pulverizing means 41 and the second pulverizing means 42 are located to allow teeth of the first pulverizing gear 412 and the second pulverizing gear 422 to engage with each other, so that they rotate together to thus allow the pulverization objects introduced between the first pulverizing gear 412 and the second pulverizing gear 422 to be pulverized by means of the teeth of the first pulverizing gear 412 and the second pulverizing gear 422.

If the first pulverizing means 41 and the second pulverizing means 42 receive the driving force of the driving part 6 through the first driven gear 4211, the second pulverizing shaft 421 to which the first driven gear 4211 is fitted rotates, together with the first driven gear 4211, and also, the first pulverizing shaft 411 connected to the second pulverizing shaft 421 through the first pulverizing gear 412 and the second pulverizing gear 422 rotates.

Further, the first pulverizing gear 412, the second pulverizing gear 422, the first compressing gear 413, and the second compressing gear 423 are helical gears so that they move forward along their teeth when the pulverization objects are pulverized.

The filter 43 includes the filter cover 431, a first front filter 432, a second front filter 433, a first rear filter 434, and a second rear filter 435.

Figure 7:
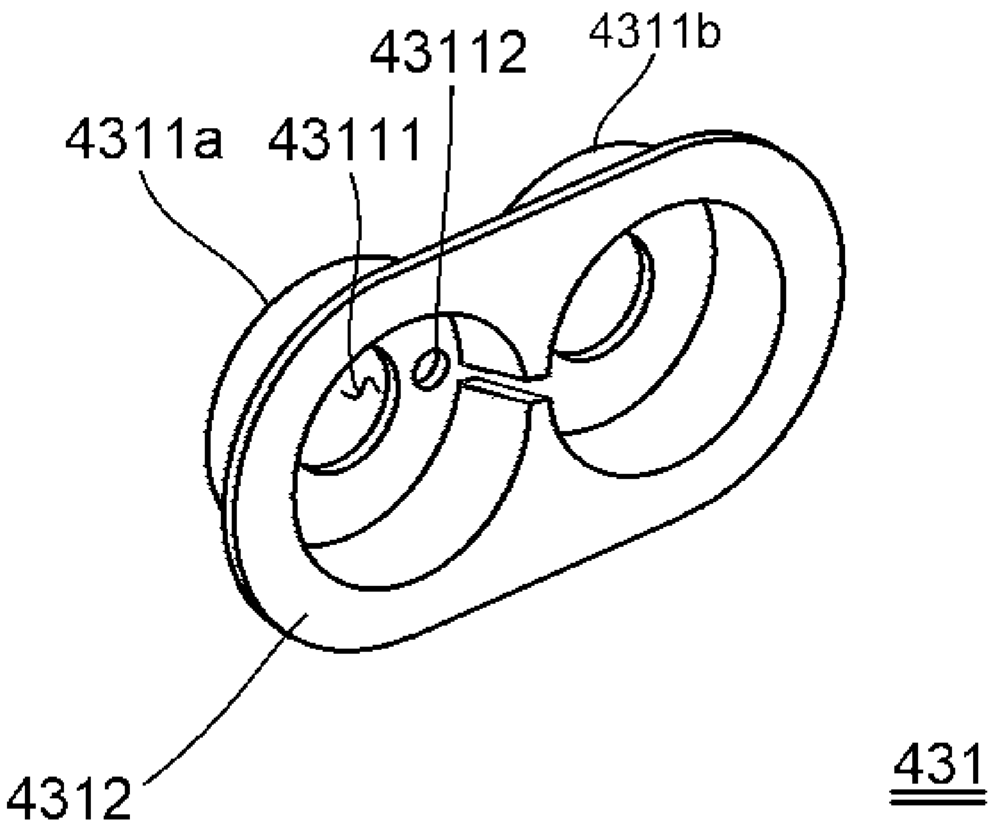
FIG. 7 is a perspective view showing the underside of a filter cover of FIG. 6.

FIG. 7 is a perspective view showing the underside of the filter cover of FIG. 6.

As shown in FIG. 7, the filter cover 431 includes compressing gear insertion portions **4311*a* and 4311*b* adapted to insert the front end peripheries of the first compressing gear 413 and the second compressing gear 423 thereinto and the extended flange 4312 extended outward from the rear end peripheries of the compressing gear insertion portions 4311*a* and 4311*b***.

The compressing gear insertion portions **4311*a* and 4311*b* have the shapes of hollow cylinders whose front surface are closed, and they are spaced apart from each other in the transverse direction of the pulverizing part casing 21**.

Further, the compressing gear insertion portions **4311*a* and 4311*b* have pulverizing shaft through holes 43111 formed on the front surfaces thereof in such a manner as to pass the pulverizing shafts 411 and 421 therethrough and the solid discharging holes 43112 formed on the front surfaces thereof in such a manner as to discharge the solids of the pulverization objects pulverized by the first pulverizing means 41 and the second pulverizing means 42** therethrough.

In this case, the inner diameters of the compressing gear insertion portions **4311*a* and 4311*b* are larger than outer diameters of the first compressing gear 413 and the second compression gear 423 and outer diameters of the first front filter 432 and the second front filter 433**.

The extended flange 4312 is extended outward from the rear end peripheries of the compressing gear insertion portions **4311*a* and 4311*b* in such a manner as to connect the compressing gear insertion portions 4311*a* and 4311*b*** to each other.

Further, the extended flange 4312 is inserted into the flange insertion groove 223 formed on the casing cover 22, and as the casing cover 22 is separated from the pulverizing part casing 21, the solids discharged from the solid discharging holes 43112 are prevented from being discharged to the water transferring portion 212.

As shown in FIG. 6, the first front filter 432 has the shape of a pair of hollow semicircular cylinders connected to each other to insert the first compressing gear 413 and the second compressing gear 423 thereinto and is provided with a plurality of water discharging holes (not shown) penetrated into the inner peripheral surface thereof from the outer peripheral surface thereof.

Further, the inner diameters of the semicircular cylinders constituting the first front filter 432 are larger than the outer diameters of the first compressing gear 413 and the second compressing gear 423, and the outer diameters thereof are smaller than the inner diameters of the compressing gear insertion portions 4311*a* and 4311*b* of the filter cover 431.

Further, the first front filter 432 has a first rear filter insertion projection 4321 protruding from the rear end periphery thereof in such a manner as to insert a front end periphery of the first rear filter 434 thereinto.

The second front filter 433 has the same shape and structure as the first front filter 432 and is coupled facingly to the first front filter 432 around the first compressing gear 413 and the second compressing gear 423.

The first front filter 432 and the second front filter 433 are coupled to each other in such a manner as to be located above and under the first compressing gear 413 and the second compressing gear 423 to surround the first compressing gear 413 and the second compressing gear 423, while their front end peripheries being inserted into the compressing gear insertion portions 4311*a* and 4311*b* of the filter cover 431.

The first rear filter 434 has the shape of a pair of hollow semicircular cylinders connected to each other to insert the first pulverizing gear 412 and the second pulverizing gear 422 thereinto and is provided with a plurality of water discharging holes (not shown) penetrated into the inner peripheral surface thereof from the outer peripheral surface thereof.

Further, the inner diameters of the semicircular cylinders constituting the first rear filter 434 are larger than the outer diameters of the first pulverizing gear 412 and the second pulverizing gear 422, and the outer diameters thereof are smaller than the inner diameter of the rear filter insertion projection 4321 of the first front filter 432.

In this case, the first rear filter 434 is located above the first pulverizing gear 412 and the second pulverizing gear 422 in such a manner as to allow the first pulverizing gear 412 and the second pulverizing gear 422 to be placed at hollow portions formed at the underside thereof.

Further, the first rear filter 434 has a pulverization object introducing hole 4341 formed on top thereof.

The pulverization object introducing hole 4341 is located under the introducing portion 211 of the pulverizing part casing 21 to allow the pulverization objects introduced from the introducing portion 211 to move toward the first pulverizing means 41 and the second pulverizing means 42.

The second rear filter 435 has the shape of a pair of hollow semicircular cylinders connected to each other to insert the first pulverizing gear 412 and the second pulverizing gear 422 thereinto and is provided with a plurality of water discharging holes (not shown) penetrated into the inner peripheral surface thereof from the outer peripheral surface thereof.

Further, the inner diameters of the semicircular cylinders constituting the second rear filter 435 are larger than the outer diameters of the first pulverizing gear 412 and the second pulverizing gear 422, and the outer diameters thereof are smaller than the inner diameter of the rear filter insertion projection 4331 of the second front filter 433.

In this case, the second rear filter 435 is located under the first pulverizing gear 412 and the second pulverizing gear 422 in such a manner as to allow the first pulverizing gear 412 and the second pulverizing gear 422 to be placed at hollow portions formed at the top thereof.

Further, the second rear filter 435 has one pair of discharging holes 4351 formed on the rear end portions.

The second rear filter 435 is normally closed in such a manner as to allow the discharging holes 4351 formed on the rear side thereof to be closed by means of the protrusions 213 of the pulverizing part casing 21 to prevent the solids from being discharged, but if the discharging holes 4351 are located on the front side of the second rear filter 435, they are open to discharge the solids to the water transferring portion 212, together with the water.

Under the above-mentioned configuration of the pulverizing part 4, if the pulverization objects are introduced into the pulverizing part 4 through the introducing portion 211, they are pulverized by means of the first and second pulverizing gears 412 and 422 of the first and second pulverizing means 41 and 42 and are then compressed against the first and second compressing gears 413 and 423, so that water is removed from them.

In this case, the water removed from the pulverization objects is discharged to the outside of the filter 43 through the water discharging holes formed on the first and second front filters 432 and 433 and the first and second rear filters 434 and 435.

Further, the solids of the pulverization objects from which the water is removed are discharged through the solid discharging holes 43112 formed on the filter cover 411.

Figure 8:
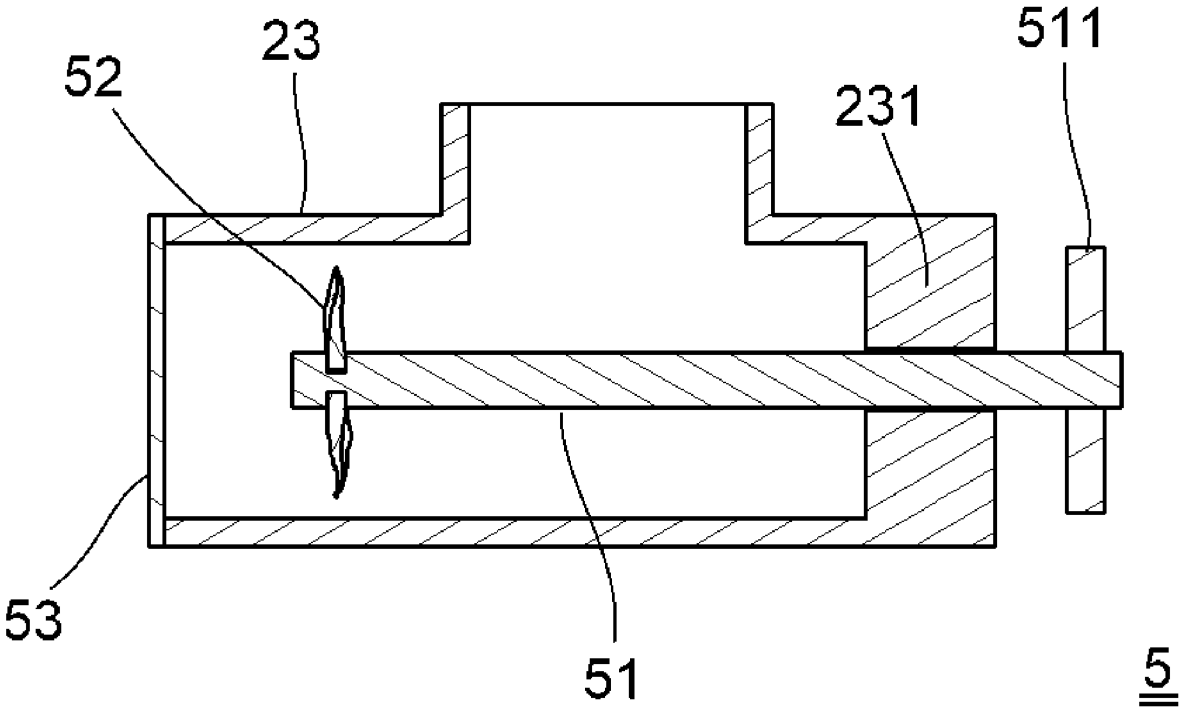
FIG. 8 is a sectional view showing a water discharging part of FIG. 2.

FIG. 8 is a sectional view showing the water discharging part of FIG. 2.

As shown in FIG. 8, the water discharging part 5 is located inside the water discharging part casing 23 and includes the propeller driving shaft 51 rotating with the driving force received from the driving gear 63 of the driving part 6 as will be discussed later, the propeller 52 rotatingly fitted to the end periphery of the propeller driving shaft 51, and an opening and closing plate 53 located on an end portion of the water discharging part casing 23 in such a manner as to open and close the end portion of the water discharging part casing 23.

The propeller driving shaft 51 is inserted into the driving shaft fitting portion 231 of the water discharging part casing 23 and has a second driven gear 511 fitted to the rear end periphery thereof.

The second driven gear 511 engages with the driving gear 63 of the driving part 6 and thus rotates with the driving force received from the driving part 6, so that the propeller driving shaft 51 coupled to the second driven gear 511 rotates.

The propeller 52 is fitted to the front end periphery of the propeller driving shaft 51, and if it rotates forward, it applies a propelling force forward to discharge the water in the water discharging part casing 23 to the drain pipe 9.

The opening and closing plate 53 has the shape of a disc and is located on the front end portion of the water discharging part casing 23.

Further, the opening and closing plate 53 is made of an elastic material like rubber, and normally, it closes the front end portion of the water discharging part casing 23 by its self weight to prevent bad smell and sewage from flowing backward from the drain pipe 9.

If the propelling force is applied to the opening and closing plate 53 from the propeller 52, furthermore, the opening and closing plate 53 is open to allow the water in the water discharging part casing 23 to be discharged to the drain pipe 9.

Under the above-mentioned configuration, normally, the water discharging part 5 closes the front end portion of the water discharging part casing 23 through the opening and closing plate 53 to prevent bad smell and sewage from flowing backward from the drain pipe 9, and if the pulverization objects and water are introduced into the casing 2, the water discharging part 5 applies the propelling force from the propeller 52 to the opening and closing plate 53 and thus to open the opening and closing plate 53, so that the water in the water discharging part casing 23 is discharged to the drain pipe 9.

Figure 9:
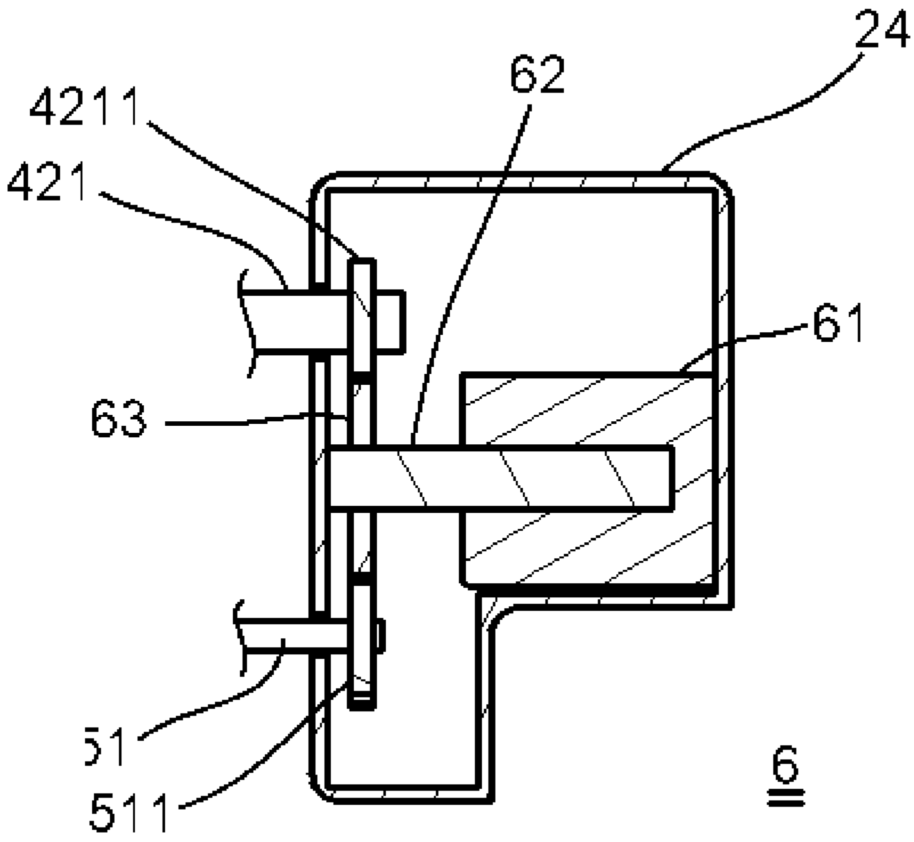
FIG. 9 is a sectional view showing a driving part of FIG. 2.

FIG. 9 is a sectional view showing the driving part of FIG. 2.

The driving part 6 includes a motor 61 located inside the driving part casing 24, a motor shaft 62 connected to the motor 61, and the driving gear 63 fitted to the end periphery of the motor shaft 62.

The driving gear 63 engages with the first driven gear 4211 and the second driven gear 511 to transfer the driving force of the motor 61 to the pulverizing part 4 and the water discharging part 5.

For the convenience of the description, in this case, the driving gear 63 engages with the first driven gear 4211 and the second driven gear 511, but of course, gears may be additionally located between the driving gear 63 and the first driven gear 4211 and the second driven gear 511, respectively, according to installation space, gear ratio, and so on.

Figure 10:
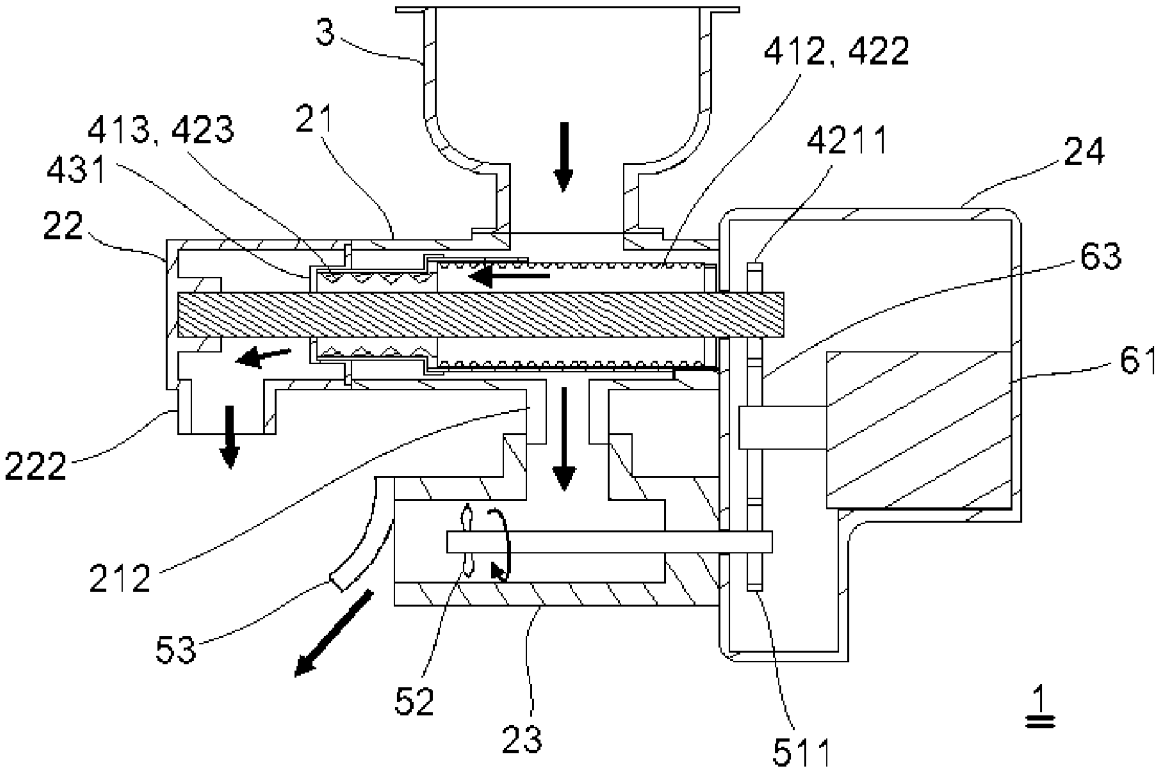
FIG. 10 is a sectional view showing an operating process of the food waste disposer according to the present invention.

FIG. 10 is a sectional view showing an operating process of the food waste disposer according to the present invention.

If the food waste disposer 1 operates by a user or if introduction of the pulverization objects is sensed by means of the sensors (not shown) located on the hopper 3, the motor 61 operates to rotate the driving gear 63 connected to the motor 61 through the motor shaft 62, and further, the first driven gear 4211 and the second driven gear 511 engaging with the driving gear 63 rotate to operate the pulverizing part 4 and the water discharging part 5.

If the pulverization objects are introduced into the pulverizing part casing 21 through the hopper 3, they are pulverized by means of the first and second pulverizing gears 412 and 422 and are then compressed against the first and second compressing gears 413 and 423, so that water is discharged from the compressed pulverization objects.

In this case, the solids of the pulverization objects are moved to the casing cover 22 through the solid discharging holes 43112 formed on the filter cover 411 and are then discharged to the outside through the solid outlet 222.

Further, the water removed from the pulverization objects moves to the water discharging part casing 23 through the water discharging holes formed on the filter 43 and is then discharged to the drain pipe 9 because the opening and closing plate 53 is open by means of the propelling force of the propeller 52.

Figure 11:
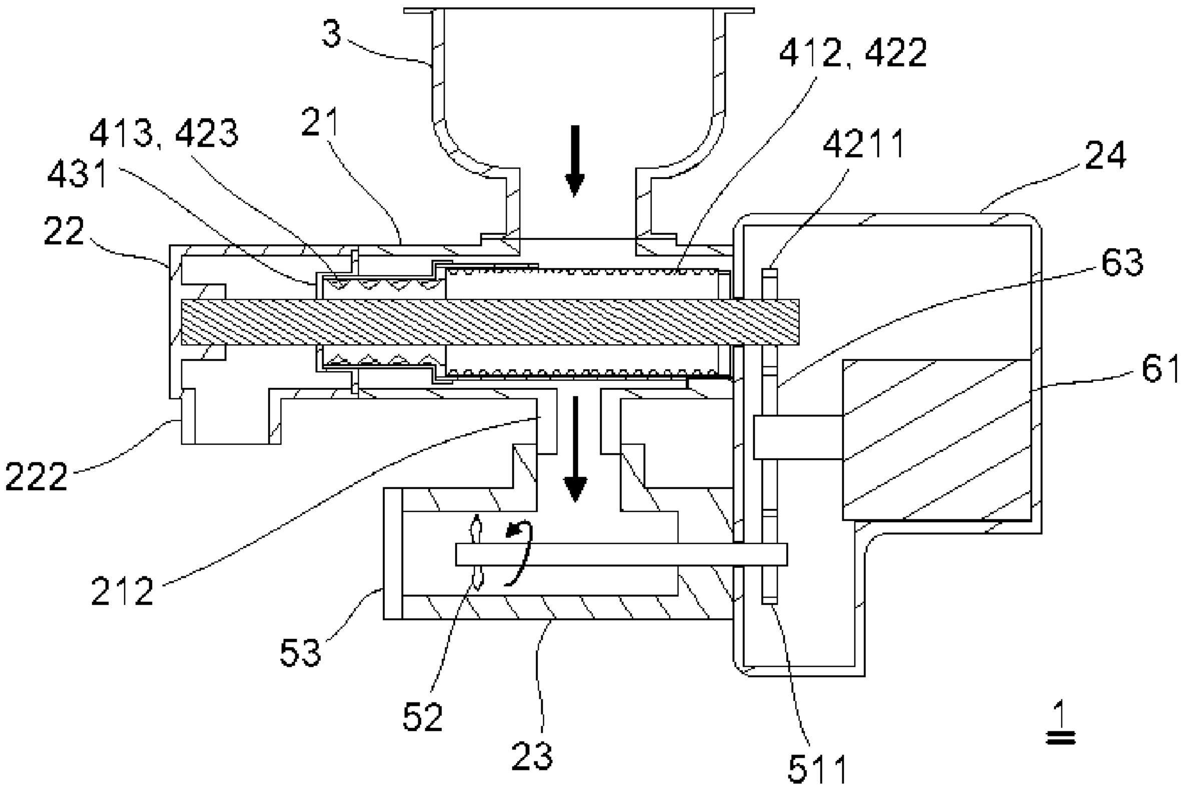
FIG. 11 is a sectional view showing a process where a motor rotates reversely to clean an interior of the food waste disposer according to the present invention.

FIG. 11 is a sectional view showing a process where the motor rotates reversely to clean an interior of the food waste disposer according to the present invention.

If the food waste disposer 1 rotates the motor 61 reversely to rotate the propeller 52 reversely, the propelling force of the propeller 52 is applied reversely to allow the opening and closing plate 53 to be closed.

In this state, if a cleaning solution or water is injected into the casing 2, the solution or water is circulated inside the casing 2, without being discharged through the drain pipe 9.

As a result, the interior of the casing 2 can be simply cleaned, without being disassembled.

What is claimed is:

1. A food waste disposer adapted to pulverize food waste introduced there to thus separate solids and water from the pulverized food waste, the food waste disposer comprising:

a box-shaped casing having a solid outlet formed on one side thereof to discharge the solids therefrom and a water outlet formed on a lower portion thereof to discharge the water therefrom;

a hopper located on top of the casing and configured to introduce the pulverization objects into the casing;

a pulverizing part located inside the casing to pulverize the pulverization objects introduced from the hopper;

a water discharging part for discharging the water of the pulverization objects pulverized by means of the pulverizing part to the outside of the casing; and a driving part for transferring power to the pulverizing part and the water discharging part, wherein the pulverizing part comprises:

a plurality of pulverizing means located inside the casing to pulverize the pulverization objects and thus to move the solids of the pulverization objects pulverized in a forward direction; and a filter located on the outside of the pulverizing means and having water discharging holes adapted to discharge the water of the pulverization objects pulverized by means of the pulverizing means therethrough and at least one or more solid discharging holes adapted to discharge the solids of the pulverization objects pulverized by means of the pulverizing means therethrough, each pulverizing means comprising: a pulverizing shaft whose front end periphery is connected to the casing; a pulverizing gear located under the hopper and configured to be fitted to the pulverizing shaft; and a compressing gear located in front of the pulverizing gear and configured to be fitted to the pulverizing shaft to compress the pulverization objects pulverized by the pulverizing gear thereagainst, and the pulverizing means being spaced apart from each other in a transverse direction of the casing and configured to allow the pulverizing gears to engage with each other, wherein the filter comprises:

a filter cover comprising a pair of compressing gear insertion portions having the shapes of hollow cylinders whose front surface are closed to insert the front end peripheries of the compressing gears thereinto and an extended flange extended outward from the rear end peripheries of the compressing gear insertion portions to connect the compressing gear insertion portions to each other;

a pair of front filters each having the shape of a pair of hollow semicircular cylinders connected to each other in a transverse direction and each provided with an insertion projection extended outward from the rear end periphery thereof so that as the front end peripheries thereof are inserted into the compressing gear insertion portions, the front filters are located above and under the compressing gears to thus surround the compressing gears; and a pair of rear filters each having the shape of a pair of hollow semicircular cylinders connected to each other in a transverse direction so that as the front end peripheries thereof are inserted into the insertion projections of the front filters, the rear filters are located above and under the pulverizing gears to thus surround the pulverizing gears, the front filters and the rear filters having a plurality of water discharging holes formed on the outer peripheral surfaces thereof, the upper side rear filter of the rear filters having a pulverization object introducing hole adapted to introduce the pulverization objects introduced from the hopper thereinto, and the filter cover having the solid discharging holes formed on the front surface thereof to discharge the solids of the pulverization objects therethrough.

2. The food waste disposer according to claim 1, wherein the casing comprises:

a pulverizing part casing adapted to locate the pulverizing part at the inside thereof and configured to allow top thereof to communicate with the hopper;

a casing cover located on the front side of the pulverizing part casing and configured to allow the rear surface thereof to communicate with the pulverizing part casing to thus discharge the solids of the pulverization objects discharged through the solid discharging holes through the solid outlet;

a water discharging part casing adapted to locate the water discharging part at the inside thereof and configured to be connected to the underside of the pulverizing part casing; and a driving part casing adapted to locate the driving part at the inside thereof and configured to be connected to the rear sides of the pulverizing part casing and the water discharging part casing.

3. The food waste disposer according to claim 2, wherein the casing cover has a flange insertion groove formed on the inner peripheral surface and configured to insert the extended flange of the filter cover thereinto, and as the extended flange is inserted into the flange insertion groove, the filter cover isolates the casing cover from the pulverizing part casing to prevent the solids and water of the pulverization objects discharged from the filter from being mixed together.

4. The food waste disposer according to claim 3, wherein the water discharging part, which is located inside the water discharging part casing, comprises:

a propeller driving shaft rotating with a driving force received from the driving part;

a propeller fitted to a front periphery of the propeller driving shaft; and an opening and closing plate located on an end portion of the water discharging part casing and configured to open and close the end portion of the water discharging part casing, the opening and closing plate being open when the propeller rotates forward.

* * * * *